Figure 1:
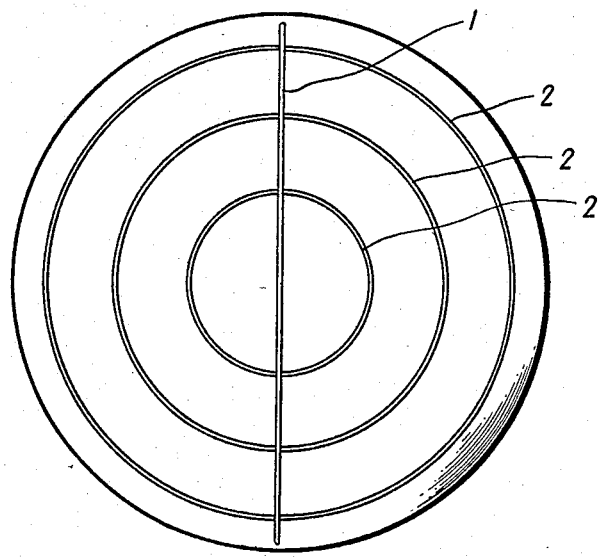

United States Patent [19]

Wichterle

[11] Patent Number: 4,512,461
[45] Date of Patent: Apr. 23, 1985

[54] APPARATUS FOR PLANARIZING AND STORING HYDROPHILIC CONTACT LENS

[75] Inventor: Otto Wichterle, Prague, Czechoslovakia

[73] Assignee: SPOFA, spojene podniky pro zdravotnickou vyrobu, Prague, Czechoslovakia

[21] Appl. No.: 330,022

[22] Filed: Dec. 11, 1981

Related U.S. Application Data

[62] Division of Ser. No. 48,895, Jun. 15, 1979, Pat. No. 4,322,139.

[30] Foreign Application Priority Data

Jun. 26, 1978 [CS]  Czechoslovakia ............... 4178-78
Jun. 26, 1978 [CS]  Czechoslovakia ............... 4179-78
Dec. 4, 1978 [CS]  Czechoslovakia ............... 7974-78

[51] Int. Cl.³ ............... B65D 81/22; A45C 11/00
[52] U.S. Cl. ............... 206/5.1; 206/45.34; 206/459
[58] Field of Search ............... 206/5.1, 45.34, 459, 206/305, 216, 460, 813

[56] References Cited

U.S. PATENT DOCUMENTS

| | | | |
|---|---|---|---|
| 1,221,184 | 4/1917 | Johnston | 206/459 |
| 1,361,824 | 12/1920 | Bugbee | 206/305 |
| 3,523,863 | 8/1970 | Juhos | 206/484 |
| 3,623,602 | 11/1971 | Valente | 206/459 |
| 4,113,088 | 9/1978 | Binkhorst | 206/216 |
| 4,122,942 | 10/1978 | Wolfson | 206/5.1 |

*Primary Examiner*—William T. Dixson, Jr.
*Attorney, Agent, or Firm*—Murray Schaffer

[57] ABSTRACT

A spherical swollen hydrophillic toric contact lens is converted into a planarized xerogel and stored and transported on a planar or moderately curved base provided with an angle scale in the range of 0 to 180 degrees. The base is formed to locate the lens above the center of the scale with the cylindric axis lying on the lines converting the 0 or 180 degrees with the center of the angle scale. A permeable cover capable of compressing the lens is placed over the lens causing the lens to assume the surface shape of the base in the xerogel state.

6 Claims, 3 Drawing Figures

APPARATUS FOR PLANARIZING AND STORING HYDROPHILIC CONTACT LENS

This is a divisional of Ser. No. 048,895, filed June 15, 1979, now U.S. Pat. No. 4,322,139.

The invention pertains to a method for the adaptation of hydrophilic-gel contact lenses into a planarized xerogel state.

Three-dimensional hydrophilic gels are noted for keeping permanently their shape in the relaxed swollen state irrespective of the previous deformations. If they are transfered into a glassy state under any kind of deformation caused by external stress, they retain this deformation until they are transfered into the state of high elasticity by swelling or heating, where they again acquire the non-deformed shape. This behavior was employed in the Czech. Pat. No. 134, 722 (Brit. Pat. No. 1,174.683; U.S. Pat. No. 3,542,906; Ger. Pat. No. 1,704.530) to force contact lenses in a dry state, i.e. in the state of so called xerogel, into the planar shape, which served, according to that invention, exclusively to the easy removal of peripheric and surface defects by grinding and polishing.

The lenses were planarized, according to the aforesaid patent, by heating of a dry lens, which was usually entirely accidentally deformed by drying, to high temperature, i.e. to the temperature above the gel transformation into a highly elastic state, planarizing the lens in this state on a flat base, and temporary fixation of the lens in this deformed state for an arbitrary period of time.

Using this method, the lens has to be heated to temperature near the depolymerization temperature and readily could be impaired when the precise working conditions are not observed. As far, this method of thermal planarization has been the only one realizable in practice, even when the planarization of lens in the swollen state and drying in the planarized state offered the second principal chance. The latter method has not been successful because the swollen planarized lens always lifted from the base during drying and became warped as the bare surface contracted by drying faster than the surface adhering to the base.

The object of this invention is a method for the adaptation of hydrophilic-gel lenses into a planarized xerogel state, consisting in clamping of a lens swollen by a volatile solvent advantageously by water, between two planar or slightly curved surfaces, at least one of which is formed by a thin foil permeable for the swelling agent, and the subsequent transformation of the lens into the xerogel state by allowing the swelling agent penetrate through the permeable foil.

The lens swollen in a volatile swelling agent may be advantageously clamped between two stretched foils permeable for the swelling agent or by pressing the lens by a stretched foil to a base, which is advantageously made of a porous material.

Instead of stretching, the foils can be advantageously pressed to the lens by a soft and elastic material, which is preferably also porous.

Some extent of permeability for a volatile swelling agent (e.g. water) can be theoretically expected with any non-metallic foils. However, the foils with a high permeability for the volatile swelling agent, i.e. the foils made of a hydrophilic material, e.g. of regenerated cellulose (cellophane) or polyamide, are for the given operation especially suitable for the practical reasons.

The drying velocity of planarized lens depends on the thickness of foil on the one hand, and on the permeability of its material for swelling agent on the other. If a thin polyethylene foil of low permeability for the swelling agent were used instead of cellophane, the period of drying would extend from several hours to move than a week. A very thin polyamide foil would be in the middle position. The cellophane foil has undisputed advantages under production conditions. Although water or hydrophilic swelling agents penetrate through cellphane by far faster than through other commercially available foils, the diffusion through it is much slower than the diffusion inside the swollen gel. Consequently, the lens dries very uniformly and irregularities do not occur, which would appear if the drying were not retarded by foil. Another advantage of cellophane consists of this strong swelling by water which causes a linear extension of about 15%. Cellophane is considerably elastic in the swollen state and can be very well tighten to the lens. Cellophane dries parallelly with the lens during the drying process, stretching spontaneously more and more, and clamps the lens most tightly just at the moment when this is most required, when a strong stress arises in the lens which has the tendency to deform it. In spite of the similarity of cellophane and hydrophilic gel, the dried cellophane has no adhesion to the dry xerogel and readily separates from the dried lens at the end of drying or at any time later.

The invention pertains also to a method consisting in tightening the swollen lens to a flat or slightly convex solid base by a thin foil permeable for the volatile swelling agent and drying of lens in this state. Because of the elasticity of thin foil, the dried lens assumes the shape of base and as the lens is very soft in the swollen state, it copies also the fine structure of surface against which it is pressed during drying. This gives the change to fix temporary any fine or rather expressively embossed drawing on the lens, which perfectly disappears by later final swelling of the lens, similarly as no trace remains after its temperary planarized state.

If a very thin permeable foil is used, e.g. just cellophane, the planarized lens may be provided with a drawing also at the side of the compression foil, for example, by insertion of corresponding projections between the lens and a compressing porous permeable layer. Thus, the direction of cylindric axis may be marked in such a way, that a straight wire or a filament is stretched in the direction of cylindric axis between the lens and the wet cellophane which tightens the lens to a smooth base.

Another advantage of the method according to the invention consists in the fact that the lens, which is firmly tightened by the elastic foil to the solid base, contracts by drying mostly or exclusively in the thickness, while its surface is preserved and remains after drying almost or entirely the same as it was in the swollen planarized state. This is the expressive difference between the lens planarized in this way and the lens planarized by the known high-temperature method, when the shape of planarized dry lens precisely corresponds to the shape of this lens in a swollen planarized state, because the planarized lens is brought to maximum relaxation of the planarized state in both cases. According to this invention, the lens is planarized to a substantially thinner shape of larger surface area. This shape is advantageous for its lower brittleness in bending and the more precise additional workability, which is important above all in adaptations of prefabricated toric lenses to stabilize their cylindric axis in accordance with the astigmatism of a patient. To prevent perfectly the surface contraction of lens by drying under the tightening foil, it is of particular advantage to provide the solid base with profiled pattern, preferably with concentric rings.

The surface extension of planarized lens may be expressively amplified, if the lens swollen to higher degree by better swelling agents than only water is employed for the planarization modified in this way. For example, the lens allowed to swell in 60% aqueous ethanol to equilibrium extends linearly about twice. This lens gave by drying under a stretched cellophane foil the xerogel planarized lens which has about four times larger surface area and is about four times thinner than the lens planarized by the high-temperature method. The similar effect may be achieved by application of other alcohols ($C_1$ to $C_6$), for example, of methanol, isopropyl alcohol, propanol, butanol, and the like. As a rule, the mixtures of alcohols and their mixtures with water have even higher swelling effect than the pure components. Also other volatile hydrophilic swelling agents behave in similar way, for example, acetone, methyl ethyl ketone, formic acid, and dioxan as individuals, in mutal combinations, or diluted by water.

For the additional mechanical working of the planarized lens, e.g. grinding, polishing, or cutting with grinding, with respect to the position of cylindric axis in toric lenses, it is not necessary to remove the last traces of swelling agent from the gel. The mechanical processing is not interfered by the presence of up to 8 weight percent of non-volatile hydrophilic plasticizers, which significantly reduce the brittleness of xerogel. Glycerol is the most suitable plasticizer of the hydrophilic gel from the standpoint of physiological inertness. If other low-volatile components are used, which could irritate the cornea, e.g. glycols or polyglycols, the lens should be perfectly washed after all adaptations and before the application to a patient. Thus, a glycol methacrylate lens brought to equilibrium with the 15% aqueous solution of glycerol is impregnated to such extent, that the xerogel after complete drying contains about 4% of glycerol, which favourably reduces its brittleness. At the same time, this content of glycerol does not interfere with mechanical processing, as grinding, polishing, cutting, etc.

The swollen hydrogel lenses may be planarized, according to this invention, also in a mass scale in the wet state on a smooth base, e.g. in such a way, that they are lightly pressed to the base by finger or a rubber stopper. The base with lenses adhering by suction is then covered with a permeable foil, e.g. with wet cellophane, and with the layer of textile or other porous material (e.g. porous polyurethane, cellulose wadding, etc.) over cellophane which is lightly pressed to the base by a covering plate. After drying and disassembly of the system, the planarized lenses are removed from the base, which can be done easily and gently if a smooth flexible foil placed on a planar solid board was used as a base.

The lenses planarized in mass on the solid base may be also coated only with a permeable foil which is stretched by form fixation to the base edge before drying.

The precise planarization is of particular importance for the final processing of prefabricated toric lenses. These lenses may be produced in a large scale only as prefabricates which have the specified fundamental and cylindric refractions, but require adaptation to stabilize their position in an eye according to the individually determined astigmatism angle of patient's eye. This final adaptation consists in truncation along a chord at the lens periphery and results in prevented rotation of the lens in an eye and its stabilization in such position that the chord is placed below and horizontally. This adaptation has to be performed with a dry lens indeed, because the edge formed by truncation needs to be rounded and polished. Such adaptation is almost impossible with the lens which is deformed by drying and it is relatively difficult and skill demanding if performed with the xerogel replice produced, for example, by machining and having the shape of the relaxed swollen lens. On the other hand, this adaptation is very simple and reliable if performed with the planarized xerogel lens.

Another feature of the invention consists in the fact, that the completely or partially planarized prefabricated toric gel lens is adapted in the xerogel state, i.e. in the state when the gel is either completely free of any swelling agent or its content of swelling agent is below 8%, in such a way that it is provided with an embossed drawing by a reversible deformation, which drawing clearly shows, for example, the direction of its cylindric axis. The reversible deformation has to be understood the deformation which has the permanent character in the xerogel glassy state, but which perfectly disappears as soon as the lens is transferred by swelling into the high-elastic state. Marking of the direction of cylindric axis can be most advantageously realized by one or several straight lines which are parallel with the cylindric axis. It can be also performed in the form of arrows or other signs placed at the circumference the connecting line of which leads in the direction of cylindric axis. These lines represent a safe and objective guide for the staff of consulting rooms, who can, in accordance with the examination of patient, reliably find the place where the truncation has to be carried out. This determination can be further facilitated by providing the lens at the circumference with an angle scale ranging from 0° to 180° and marking the deviation from the cylindric axis of lens.

The surface of lens may be advantageously as much as three times enlarged in relation to the surface which would exhibit the water-swollen lens in the planarized state. The advantage of this planarized lens with increased diameter consists in the possibility to provide it with a larger drawing which is better visible and enables the more precise direction finding than with the planarized lens without area extension. The reduced brittleness of lenses with large diameter and smaller thickness is also of advantage. Another advantage is the substantially faster swelling of these thin lenses with large surface in physiologic saline, so that they can be brought into the state required for application to a patient within several minutes.

The lens according to the invention may advantageously contain as much as 5 weight percent of non-volatile hydrophilic plasticizers, preferably of glycerol, glycols, or polyglycols, which significantly reduce the brittleness of xerogel.

Further feature of the invention is an angle scale of the range 0°–180° created on a base, on which the contact lens in a planarized state is firmly placed concentrically above the center of the angle scale, while the cylindric axis of contact lens lies on the line connecting the angle 0° or 90° with the center of angle scale. This set for the storage and final adaptation of the planarized toric contact lens may be also advantageously provided with optical and shape parameters of lens in the swollen state. The contact lens is advantageously sealed between two protecting foils and fixed together with the foils to a solid base, preferably by means of a transparent adhesive tape. Because the base itself protects one side of the planarized lens against damage the lens fixed to the base may be covered with a protecting foil only at one side, as it is obtained, for example, in the planarization of lenses in mass, when the lenses are ordered on the solid base and coated with the stretched cellophane foil.

The most simple realization of the base can be achieved by the common bookbinding technique, i.e. by pasting of a smooth paper with a print on a cardboard of about 1 mm thickness and mounting of the reverse side with paper of the same quality. The main part of base may be also formed by a plastic foil and the print can be performed directly on this foil or by a label mounted on the foil.

The lens delivered in the set according to the invention needs not be measured again in the application center and the truncation chord is readily determined. The truncation can be reliably done by simple cutting in the planarized state so that for the finishing the simple polishing of truncation edge is required only.

At the same time, the set represents a very suitable form for distribution and unlimited storage of toric lenses in a lucid and compact way. It enabled to furnish also smaller application centers with the whole assortment of toric lenses, which is simplified by allowing the parameter of cylindric axis declination, which would otherwise require many times higher number of stock types, to the individual adaptation according to patients. The final adaptation according to the described method is so simple that does not require the specially skilled worker.

Because some terms used in this description of invention have not the completely established meaning, their definitions are given as follows:

Hydrophilic-gel contact lens is the contact lens made of a sightly crosslinked polymer which contains more than 10% of water, being in equilibrium with water or physiologic saline.

Xerogel state is to be understood the state of dehydration when the gel acquires the properties of hard material which can be processed by mechanical methods, namely by machining, grinding, or polishing. The characteristic feature of this state is the inability of material to relax spontaneously its internal stresses which were introduced during drying or by "freezing" of the deformed heated xerogel sample above the temperature of xerogel transistion into the high-elastic state.

Toric contact lens is the lens, the refractive power of which differs in different axial planes, while the plane of highest refraction is as a rule perpendicular to the plane of lowest refraction. The inner surface or the outer surface or both these surfaces are aspheric in the optical zone, i.e. up to the diameter of 5–10 mm.

Figure 2:
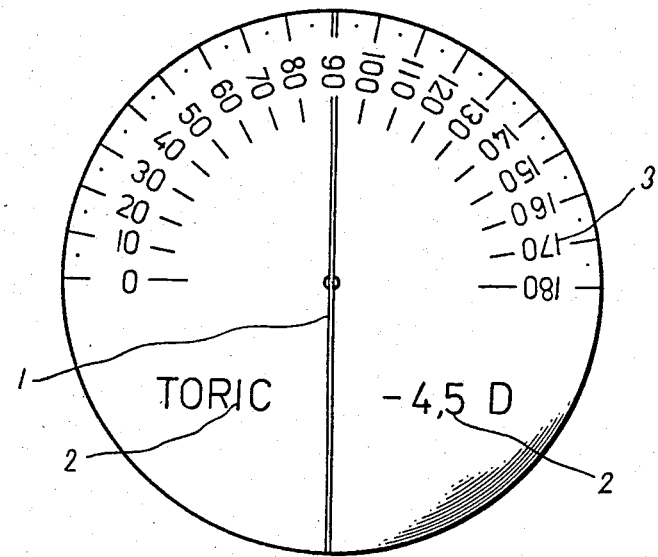
Figure 3:
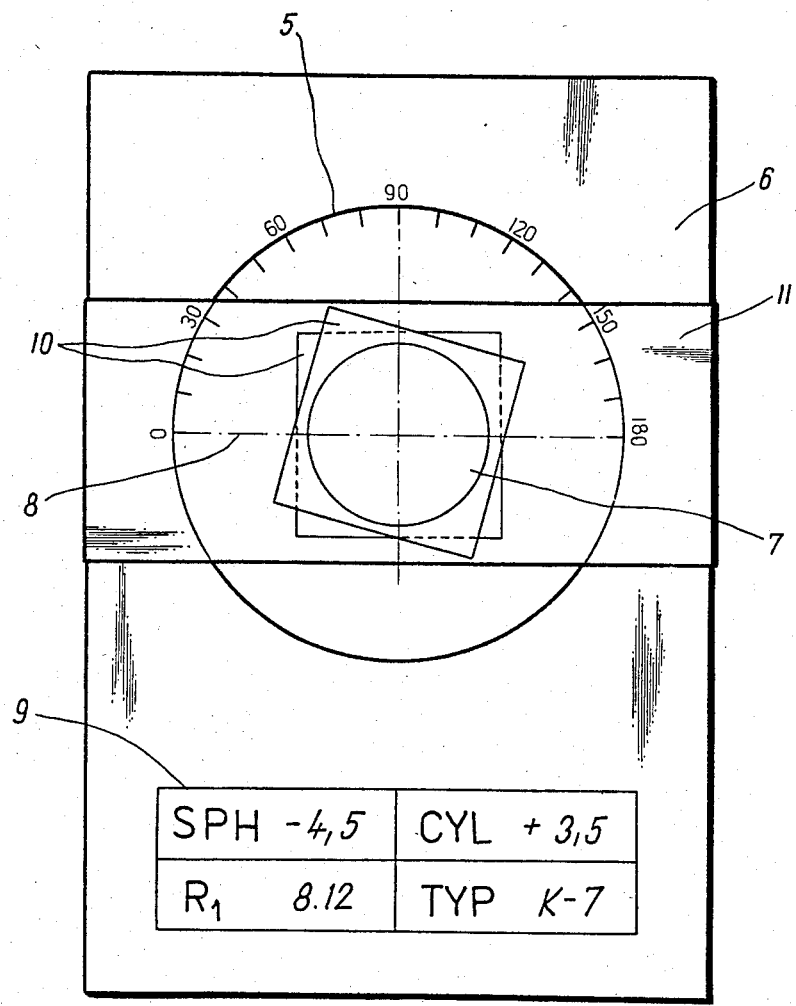

The toric lens according to the invention and the set with the planarized toric contact lens are further shown in drawings, where FIG. 1 and FIG. 2 represent a view on the planarized surface of lens in the enlarged scale and FIG. 3 shows the front view of the set according to the invention.

The lens on FIG. 1 is provided with an embossed drawing, where the radial clean-cut line determines its cylindric axis and the concentric rings 2 remained from the planarization procedure, where they prevented the lens from surface contraction during drying.

According to FIG. 2, the lens is provided, in addition to the radial line 1 of the same purpose as in FIG. 1, with the marginal angle scale 3 and the marking of lens type 4. The embossed drawing may be performed both into depth and above the neighbouring surface of lens. However, with respect to the further mechanical processing it is advantageous if the drawing is performed into depth.

According to FIG. 3, the base 6 is provided with the angle scale 5 in the range 0° to 180°. The contact lens 7 in the planarized state is concentrically placed on this base 6 above the center of the angle scale. The cylindric axis 8 of the contact lens 7 lies on the line which connects the angle 0° or 90° with the center of angle scale 5. The base 6 is advantageously provided with optical and shape parameters 9 of the contact lens in the equilibrium swollen state. Also other data may be given here, which may be of interest for application, as for example, the shape type of lens, diameter, sagittal depth, the inner and outer central diameters of curvature, the central corneal, peripheral, and average thicknesses, and the like. The data identifying the lens precisely concerning the manifacturing and others may be placed on the reverse side of base. The contact lens may be sealed between two protecting foils 10 and together with them fixed to the base 6 by means of a transparent adhesive tape 11. The final adaptation—stabilizing truncation along the chord of lens 7—is carried out with respect to the angle of astigmatic axis of the patient's eye advantageously directly on the base 6.

The planarized dry form of hydrogel lenses is advantageous for their unlimited shelf life also in an unsterile medium, while the gel lenses in swollen state may be easily infected and depreciated by molds if they were not sterile adjusted. Another advantage of the planarized form consists in its ready handling. In contradiction to the lenses simply dried and deformed by drying or dry lenses transformed at higher temperature into the form of a regular xerogel replica, the sharp and thin edge of the lenses according to the invention is less vulnerable in handling and transportation, because the planarized lens leans against the walls of cover by its whole surface, while the concave dry replicas of lenses, and the more the lenses deformed by drying, have their edge exposed to high specific pressure even at minute pushing or impact at the walls of packing.

The planar form is also very convenient for delivery, because it is suitable for safe sending the lenses in letters.

The advantages of the planarization method according to the invention following from comparison with the known high-temperature planarization are namely these:

1. Transformation of the lens into the xerogel planarized state is carried out according to the described method at low temperature, when the macromolecular structure of gel cannot be damaged, while the high-temperature planarization proceeds at temperatures dangerously close to the temperature of depolymerization and destruction of the polymer.

2. The lens which is shaped into the planarized form in a strongly swollen state is much softer than the lens heated to a narrow temperature range between the softening temperature and the decomposition temperature of dry gel in the high-temperature planarization. Consequently, the swollen lens adapts much more precisely even to the finest structures of surfaces between or to which it is clamped, thus allowing to form any fine drawings on the lens, which are permanently preserved in the dry state under the common atmospheric conditions and which completely disappear by reswelling.

3. The planarization by drying of a highly swollen lens tightened by a permeable foil gives the planar lens of larger diameter and thinner than in the high-temperature planarization.

4. The operation at ambient temperature has less requirements to the skill of workers and the working operations connected with this method are shorter than the operations in thermal planarization.

5. The new method enables also the mass planarization of a large number of lenses on one base at once.

6. The method according to the invention is less expensive, simpler and gentle to the lens.

The adaptation of toric lens into the planarized form according to the invention has the advantage, that the whole segment in the given direction can be in the planar arrangement truncated all at once by one simple operation, e.g. by compression of knife or by means of pincers, and the relatively tedious removal by grinding may be avoided. The splitting-off is entirely reliable, without formation of cracks in an undesired direction or without irregularly splitted edges, especially if the lens was impregnated with glycerol prior to planarization.

The invention is further illustrated in examples of performance without limiting its scope by any means.

EXAMPLE 1

Standard poly(glycol methacrylate) hydrogel contact lenses produced by centrifugal casting were washed by distilled water for 24 hours. The lenses were then closely side by side forced by a soft rubber stopper against a smooth poly(vinyl chloride) foil of thickness 0.4 mm. Then they were coated with a wet cellophane foil and the exceeding cellophane was bent and stuck on the reverse side of base foil. The base was placed by the reverse side with exceeding fixed parts of cellophane foil on a solid duralumin plate, the upper side was covered with a fine cotton fabric and lightly loaded, then with the layer of cellulose wadding, and finally with a planar duralumin plate. After about 15 hours, the coating layers were removed and the dried and precisely planarized lenses were separated from the base foil and coating cellophane. The lenses had the entirely regular circular shape and the perfectly smooth circumference and may be easily inserted into packing, where they are clamped between two adjoining walls. For the purpose of application to patients, they are soaked in physiologic saline where they resume their original shape. The lens is perfectly recovered within several minutes in the boiling physiologic saline.

EXAMPLE 2

The same original lens as in Example 1 was washed for 24 hours in the 15% aqeuous solution of glycerol, instead in water, and further was processed in the same way as in Example 1. The resulting planarized lenses advantageously differ from lenses obtained according to Example 1 by the reduced brittleness.

EXAMPLE 3

The same lens as in Example 1 was planarized between two water-swollen cellophane foils which were stretched by drawing over a metal ring of diameter 30 mm and fixed to the ring by a rubber ring. The planarized lens remained, after several hours of drying, sealed between both perfectly stretched foils. Greater number of lenses, which are swollen in water or glycerol solution, can be dried in the planar state at the same time in the similar way in a larger ring.

EXAMPLE 4

The centrifugally cast toric lens from the glycol methacrylate lightly crosslinked gel had the diameter of base 13.5 mm and the sagittal height 3.5 mm after swelling in physiologic saline. It was marked in the direction of its highest minus refraction by small flat and rounded projections of the shape of elongated ellipse with half-axes 0.3 and 0.8 mm. The lens was pressed against the planar plate of non-plasticized poly(vinyl chloride) provided with engraved or stamped straight grooves of a half-cylindric profile 0.3 mm deep. It was marked by small flat and rounded projections of the shape of elongated ellipse with half-axes 0.3 and 0.8 mm long in the direction of its highest minus refraction. This lens was immersed into the 10% solution of glycerol in water for 12 hours. Then it was pressed against a planar plate of non-plasticized poly(vinyl chloride) which had the engraved or stamped straight grooves of semicylindric profile and depth of 0.3 mm. The swollen lenses were planarized by light pressing by means of a soft rubber stopper and at the same time placed above the engraved grooves of base in such a way, that a groove led precisely below the opposite small rounded marks showing the cylindric axis of lens. The plate with planarized lenses was then covered with water-swollen cellophane, the cellophane was coated with a fine cotton fabric and a 5 mm thick woolen felt and lightly loaded by a perforated steel sheet. The system was disassembled after 24 hours and the dried planarized lenses were removed from the base plate. Their diameter was 14.6 mm and the reverse side had embossed the distinct radial line projecting above the surface of the flated reverse side of lens. The lens adapted in this way can be precisely directed for the final mechanical processing, namely for truncation according to the slope of cylindric axis of patient's eye.

EXAMPLE 5

The lens in the original state, as it is described in Example 4, was allowed in contact with 20% aqueous glycerol for 12 hours and pressed for planarization against a base of cylindric shape made of polypropylene. The base has the slightly convex circular surface of the curvature radius 150 mm provided with a marginal angle scale with the 90°-mark at the radial line, and an identification of producer and lens type placed on the remaining free area of circular surface. A wet cellophane foil was stretched over the planarized lens oriented by marginal marks in the direction of thick radial line in such a way, that a rubber ring was slid over the foil fitting tightly to the side cylindric wall of circular base. The cellophane foil was removed after 10 hours and the planarized lens was released from the base. In this case, the lens has, in addition to the radial line, also the distinct angle scale, which enables to find the slope of truncation of the lens corresponding to the astigmatism of the examined patient without any devices. The truncated segment may be then cut by simple pincers without forming the undesired cracks, which would be formed if the lens were not impregnated by glycerol. The final adaptation of lens is easily performed by the manual draw filling of the new created edge by a fine emery paper and then by a cloth with polishing paste. It is recommended to mark the lens by a distinct dark pigmentation exactly opposite the truncation for the purpose of later checking of the lens position in patient's eye. The pigmentation is carried out in the simplest way by a 2% solution of permanganate which diffused into the lens within 3 minutes and forms inside the pigment of brown manganese dioxide.

EXAMPLE 6

The procedure described in Example 4 was modified by impregnation of the lens with an aqueous solution prepared by mixing of 75 volume parts of water, 21 volume parts of ethanol, and 5 volume parts of glycerol, instead of impregnation with aqueous glycerol. The lens swelled in this solution to such extent, that it had, after planarization on a drying base, the diameter of 19 mm, instead of 14.6 mm obtained in both preceding examples with the lens stored in the aqueous solution of glycerol. Therefore, a base with enlarged drawing can be used. The planarized lens removed from the base after drying had the diameter of 19 mm and advantageously differed from the lenses planarized according to the preceding Example by the angle scale distinctly visible with the naked eye. The direction finding for the final adaptation can be done comfortably and even more precisely.

EXAMPLE 7

The centrifugally cast toric lens with projections marking the direction of cylindric axis, as it is described in Example 3, was pressed in the swollen state against a planar smooth base to assume the planarized shape and coated with the wet cellophane. A polyamide string of thickness 0.35 mm was stretched over the cellophane and the center of lens in such way, that it lay exactly above the projections marking the cylindric axis. The foil and the string were pressed to the lens by means of a fine cotton textile and a 5 mm thick felt by loading these layers with a 1-kg weight. The planarized dried lens was released after 10 hours. It was temporarily provided with the recessed straight radial line for the precise directing of lens for final adaptation (truncation).

EXAMPLE 8

The water-swollen toric lens of the type described in Example 4 was planarized by pressing against a glass base of 50×50 mm size and coated with a water-swollen square cellophane foil 70×70 mm, which was turned by 45° with respect to the square glass. The four triangular exceeding parts of foil were bent and pressed to the revers side of glass. After one-day drying under the perfectly stretched foil, the precisely planarized lens was obtained with slightly visible projections which determined its cylindric axis. By means of these projections, the axis can be distinctly marked on the foil and also an angle scale may be printed on the foil or the reverse side of glass which enables the truncation and polishing of the new-formed edge to be done very precisely without any danger for the lens, which strongly adhers to glass. The adhesion of lens to glass may be even enhanced, if the swollen lens is wetted before planarization by an aqueous solution of water-soluble binder, e.g. by the solution of partially converted and slightly caramelized saccharose. After being finished, the lens is set free in boiling saline.

I claim:

1. Apparatus for converting a spherical hydrophilic toric contact lens swollen in a volatile swelling agent and having its cylindric axis indicated thereon, into a planarized xerogel and for thereafter storing and transporting said lens in the xerogel state comprising a rigid planar or moderately curved base for supporting said lens, said base being provided with an angle scale in the range of 0 degrees to 180 degrees, and being adapted to locate the contact lens above the center of the scale, the cylindric axis of the contact lens lying on the line connecting the angles 0 degrees or 180 degrees with the center of the angle scale and means for removably fixing said lens to said base, said means being permeable to said swelling agent and being capable of compressing said swollen lens to the surface of said base so that said lens assumes the planar or moderately curved shape of the base in the xerogel state.

2. The apparatus according to claim 1, in which said means for fixing said lens is provided with indicia corresponding to the optical and shape parameters of contact lens in its equilibrium swollen state.

3. The apparatus according to claim 1, wherein the swollen contact lens is covered on at least one side with a protecting foil prior to compression between said base and the fixing means.

4. The apparatus according to claims 1, 2, or 3, wherein said means for fixing said lens to said base is transparent adhesive tape.

5. The apparatus according to claim 2, wherein said indicia is formed on said means so as to emboss said indicia directly onto said lens in its xerogel state.

6. The apparatus according to claim 3 wherein the swollen contact lens is covered on both sides with a transparent protective foil on which is drawn indicia corresponding to the optical and shape parameters of the contact lens in its equilaterally swollen state.

* * * * *